(12) United States Patent
Niles

(10) Patent No.: US 9,798,716 B2
(45) Date of Patent: Oct. 24, 2017

(54) INTERNET OF THINGS LANGUAGE SETTING SYSTEM

(71) Applicant: James E. Niles, New York, NY (US)

(72) Inventor: James E. Niles, New York, NY (US)

( * ) Notice: Subject to any disclaimer, the term of this patent is extended or adjusted under 35 U.S.C. 154(b) by 0 days.

(21) Appl. No.: 14/928,411

(22) Filed: Oct. 30, 2015

(65) Prior Publication Data

US 2016/0170959 A1    Jun. 16, 2016

Related U.S. Application Data

(60) Provisional application No. 62/089,881, filed on Dec. 10, 2014.

(51) Int. Cl.
  *G06F 1/24* (2006.01)
  *G06F 17/27* (2006.01)
  *G06F 9/445* (2006.01)
  *H04M 1/725* (2006.01)

(52) U.S. Cl.
  CPC .......... *G06F 17/275* (2013.01); *G06F 9/4451* (2013.01); *H04M 1/72533* (2013.01); *H04M 2250/58* (2013.01)

(58) Field of Classification Search
  CPC ............................... G06F 17/20; G08B 13/00
  USPC .......................................................... 713/100
  See application file for complete search history.

(56) References Cited

U.S. PATENT DOCUMENTS

| 9,507,775 | B1* | 11/2016 | Niles ..................... G06F 17/275 |
| 2003/0005159 | A1* | 1/2003 | Kumhyr .............. G06F 17/3089 709/246 |
| 2005/0051620 | A1* | 3/2005 | DiLuoffo .................. G07F 7/08 235/382 |
| 2008/0294424 | A1* | 11/2008 | Naito ..................... G06F 9/4448 704/8 |
| 2008/0300880 | A1* | 12/2008 | Gelbman .............. G06F 17/289 704/256 |
| 2010/0045460 | A1* | 2/2010 | Caler .................... G08B 25/012 340/541 |
| 2011/0077934 | A1* | 3/2011 | Kanevsky ............ G06Q 20/102 704/3 |
| 2011/0218812 | A1* | 9/2011 | Patel ................... G06Q 30/0283 704/277 |
| 2012/0112877 | A1* | 5/2012 | Gravino ................. G05B 15/02 340/4.31 |
| 2012/0311019 | A1* | 12/2012 | Raman ............... G06Q 20/3278 709/203 |
| 2014/0365858 | A1* | 12/2014 | Travieso ............. G06F 17/2827 715/229 |
| 2015/0056961 | A1* | 2/2015 | Jones ...................... H04W 4/06 455/414.1 |
| 2015/0161099 | A1* | 6/2015 | Lee ....................... G06F 17/275 345/171 |

(Continued)

*Primary Examiner* — Vincent Tran

(57) ABSTRACT

A programmable device is configured to detect a user preferred language from one or more other devices. When the programmable device is automatically programmed, the device provides a complete, seamless integrated experience and a user can immediately interact with the programmable device in a known language. The preferred device language can be set by reference to a user device, such as a phone, tablet, and/or other personal electronic device, by reference to one or more additional programmable devices in communication with the programmable device, and/or reference to a remote server storing the language preference of the user.

20 Claims, 9 Drawing Sheets

(56) References Cited

U.S. PATENT DOCUMENTS

| | | | |
|---|---|---|---|
| 2015/0199338 A1* | 7/2015 | Freiberg | G06F 17/289 704/9 |
| 2015/0324336 A1* | 11/2015 | Glezos | G06F 17/2247 715/234 |
| 2015/0379986 A1* | 12/2015 | Golding | G10L 15/08 704/246 |
| 2016/0036740 A1* | 2/2016 | Barber | H04L 51/063 704/3 |
| 2016/0088089 A1* | 3/2016 | Migdalovich | H04L 67/125 705/14.73 |
| 2016/0107577 A1* | 4/2016 | Niles | G06F 9/4448 704/3 |

\* cited by examiner

INTERNET OF THINGS LANGUAGE SETTING SYSTEM

CROSS-REFERENCE TO RELATED APPLICATION

This application claims benefit to U.S. Provisional Patent Appl. Ser. No. 62/089,881, filed Dec. 10, 2014, and entitled "INTERNET OF THINGS LANGUAGE SETTING SYSTEM," which is hereby incorporated by reference in its entirety.

TECHNICAL FIELD

The disclosed systems and methods relate generally to device communication and interaction with programmable devices. More particularly, the present invention relates to systems and methods for allowing programmable devices to automatically configure a language element.

BACKGROUND

Consumers now expect a full seamless user experience when setting up programmable devices, which is the keystone of success for the consumer electronic industry. In today's environment, more and more technological "internet of things" or smart devices/appliances (e.g., programmable devices) are being implemented in both residential and commercial settings. While all programmable devices contained in a smart home or smart rooms communicate with each other, there often is a shortcoming in communication with the user or habitant. In particular, the native language of the user may not be that of the smart device default operating language which then fails to provide the intended user experience because of the language barrier.

Manually setting the language of any programmable device can be tricky, confusing, and time consuming, as a user must navigate a never-ending menu selection, which can also be in an unknown language. Multiple devices each require manual configuration. In some instances, devices encountered while traveling and/or in shared-spaces can have languages other than default or known languages and can have language preferences altered after being manually set by the user. In addition, millions of consumer/end-users travel internationally each year to countries where language other than their own are spoken, displayed, or written, and it is a frequent occurrence that travelers are unable to understand the information that is provided on devices. Accordingly, the mismatch between travelers and the devices implicates safety concerns, as travelers may not understand the default language and therefore fail to heed warnings or critical instructions provided by the device.

BRIEF SUMMARY

In various embodiments, a method for customizing one or more programmable devices in a predetermined space is disclosed. The method includes detecting, by a sensor, a user presence in a room. A processor receives a user language preference. The processor customizes one or more programmable devices to use the user language preference.

In various embodiments, a system is disclosed. The system comprises at least one programmable device including a programmable language element. The at least one programmable device is configured to receive a user language preference. The programmable language element of the programmable device is automatically configured with the user language preference.

In various embodiments, a method for customizing a programmable device is disclosed. The method comprises detecting, by the programmable device, a user device within a predetermined proximity. The programmable device established a connection with a user device. A user language preference is received from the user device. The programmable device customizes a language element with the user language preference.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

In various embodiments, systems and methods for automatically setting an active language on a programmable device are disclosed. The programmable device is configured to detect a user preferred language from one or more other devices. When the programmable device is automatically programmed, the device provides a complete, seamless integrated experience and a user can immediately interact with the programmable device in a known language. In some embodiments, the default programmable device language is set by reference to a user device, such as a phone, tablet, and/or other personal electronic device. In some embodiments, the default programmable device language is set by reference to one or more additional programmable devices in communication with the programmable device and/or a remote server storing the language preference of the user.

In some embodiments, systems and methods for automatically setting an active language on a programmable device are configured to provide a fulfilling user experience to the user through seamless integration of a user device and one or more programmable devices. When a connection between a user device and a programmable device is established, the programmable device is configured with the user's native language automatically to provide a seamless interaction with the user. In some embodiments, one or more sensors connected (wired or wireless) to one or more programmable devices can initiate communication between a user device, the programmable device, and/or one or more additional programmable devices. In various embodiments, connectivity can require proximity and/or contact between a user device and a programmable device, a unique network identifier for each of the user device and programmable devices (such as an IP address), power for each of the user device and the programmable devices, and/or any other suitable connectivity requirement.

In some embodiments, a preferred language of a user can be determined by scanning one or more examples of a user native language, such as e-mails, text messages, or other text-based files stored on a user device. In some embodiments, a user default language is stored within an app and/or other file on a user device and/or additional programmable devices. In some embodiments, a user may be prompted to select a preferred language if multiple preferred languages are detected.

Figure 1:
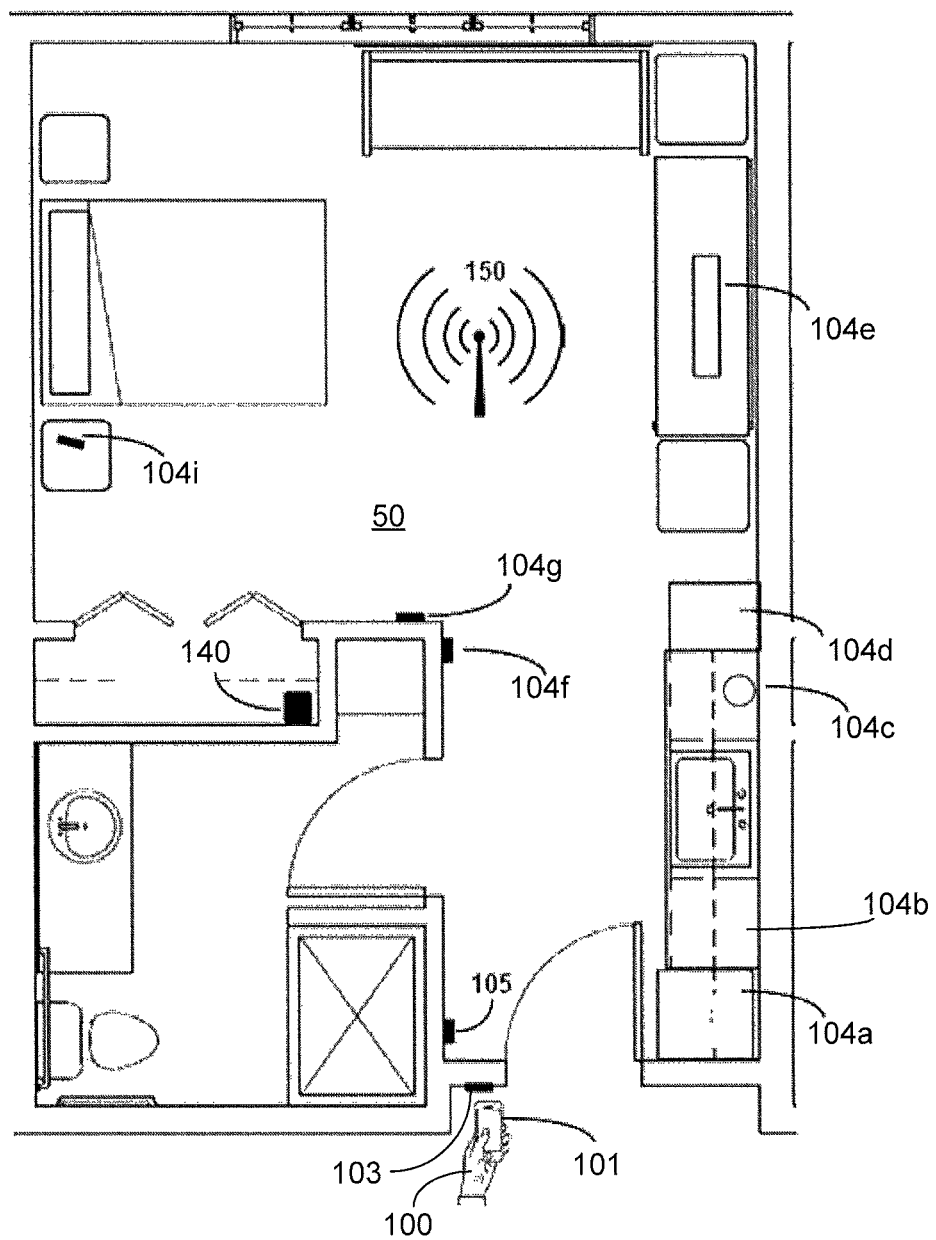
FIG. 1 illustrates a plan view of one embodiment of a user entering a room having plurality of programmable devices therein, in accordance with the present disclosure.

FIG. 1 illustrates a plan view of one embodiment of a user 100 entering a predetermined space 50 having plurality of programmable devices 104a-104l (collectively "programmable devices 104") therein, in accordance with the present disclosure. The predetermined space 50 may be a residential or commercial room, including but not limited to an apartment, hotel room, cruise ship cabin, house, or other residential and/or commercial room. In some embodiments, a user 100 has a user device 101. The user device 101 may be any suitable personal device, such as, for example, a smart phone, a tablet, a laptop, and/or any other suitable personal device. The programmable devices 104 can comprise any suitable device having one or more programmable settings, such as a language setting, including, for example, smart devices, Internet of Things devices, and/or other programmable devices. The user device 101 has a preferred (or native) language previously determined by the user 100. In some embodiments, accessing the room 50 requires interaction between the user device 101 and a room lock 103, for example, requiring proximity and/or direct contact between the user device 101 and the room lock 103. In some embodiments, a user 100 can access the room 50 through an alternative means, such as a key, keycard, or other access means.

In some embodiments, the room lock 103 and/or a sensor 105 located within the room recognizes that the user 100 has entered the room 50. The room lock 103 and/or the sensor 105 can require proximity and/or direct contact with a user device 101. Connectivity is established between the user device 101 and one or more programmable devices 104 over a network 150. The user's 100 default language preference can be detected from the user device 101. In some embodiments, the plurality of programmable devices 104 are automatically configured over the network 150. In some embodiments, each of the plurality of programmable devices 104 is configured during user interaction.

In some embodiments, a networked monitoring/control hub 140 is configured to control configuration and/or operation of each of the plurality of programmable devices 104. The control hub 140 can be located in the room 50 or remotely from the room 50. In some embodiments, the control hub 140 is configured to detect the user's 100 language preference from the user device 101 and configure each of the programmable devices 104 with the user's 100 preferred language.

In some embodiments, a user's 100 preferred language can be stored in a remote server (not shown) and can be accessed when connectivity is established between a user device 101, one or more programmable devices 104, and/or a control hub 140. A user 100 may authorize access to remotely stored preferred language data, for example, through a unique identifier such as a phone number, pin, and/or other unique identifier. In some embodiments, two or more preferred languages can be identified, for example, if a user 100 is bi- or multi-lingual. If multiple preferred languages are identified, the user 100 may be prompted to manually select a preferred language, for example, from a list of the identified preferred languages.

In some embodiments, a user's 100 language preference is determined with reference to one or more files on a user device 101. For example, in some embodiments, a user 100 may not have a defined preferred language preference. One or more programmable devices 104 and/or the control hub 140 can be configured to scan one or more text-based files on a user device 101 to determine a native and/or known language of the user 100. Text-based files can include, for example, text messages, e-mail, documents, and/or other text-based files stored on the user device 101. In some embodiments, a user's language preference, native, or known language may be stored within an application ("app") located on the user device 101 and/or remotely from the user device 101.

In some embodiments, one or more of the programmable devices 104 and/or the control hub 140 stores the default language preference of the user 100. The default language preference can be stored for future reference, such as, for example, for quick programming of the programmable devices 104 if a user returns to the room 50. In some embodiments, the default language preference is stored locally by the one or more programmable devices 104 and/or the control hub 140 and/or stored remotely, for example, in a remote server (not shown). In some embodiments, the user 100 can disable language synchronization before and/or after the user's 100 default language has been detected. After language configuration is completed, the programmable devices 104 can display (audio or visual) information to the user 100 in the user's 100 native and/or preferred language.

Figure 2:
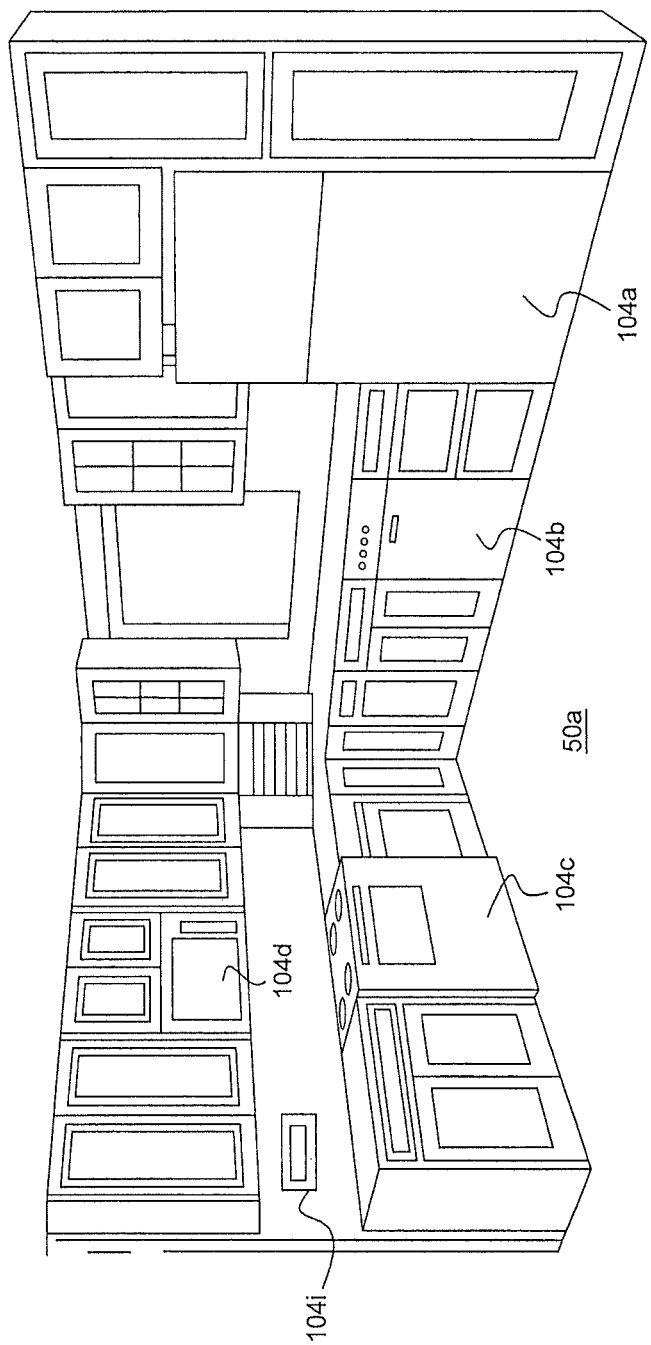
FIG. 2 illustrates a diagrammatic perspective view of one embodiment of a kitchen including a plurality of programmable devices therein, in accordance with the present disclosure.
Figure 3:
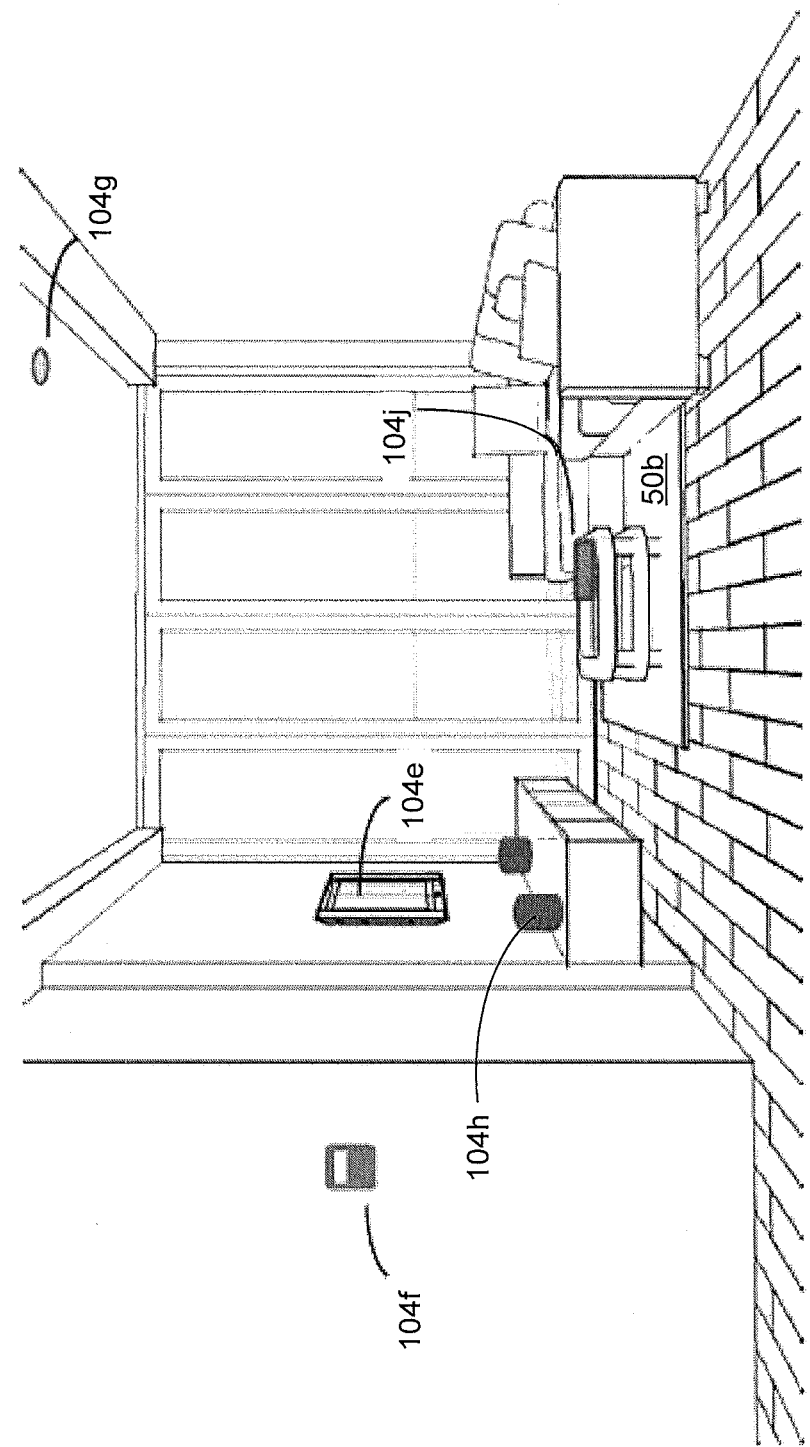
FIG. 3 illustrates a diagrammatic perspective view of one embodiment of a living room including a plurality of programmable devices therein, in accordance with the present disclosure.
Figure 4:
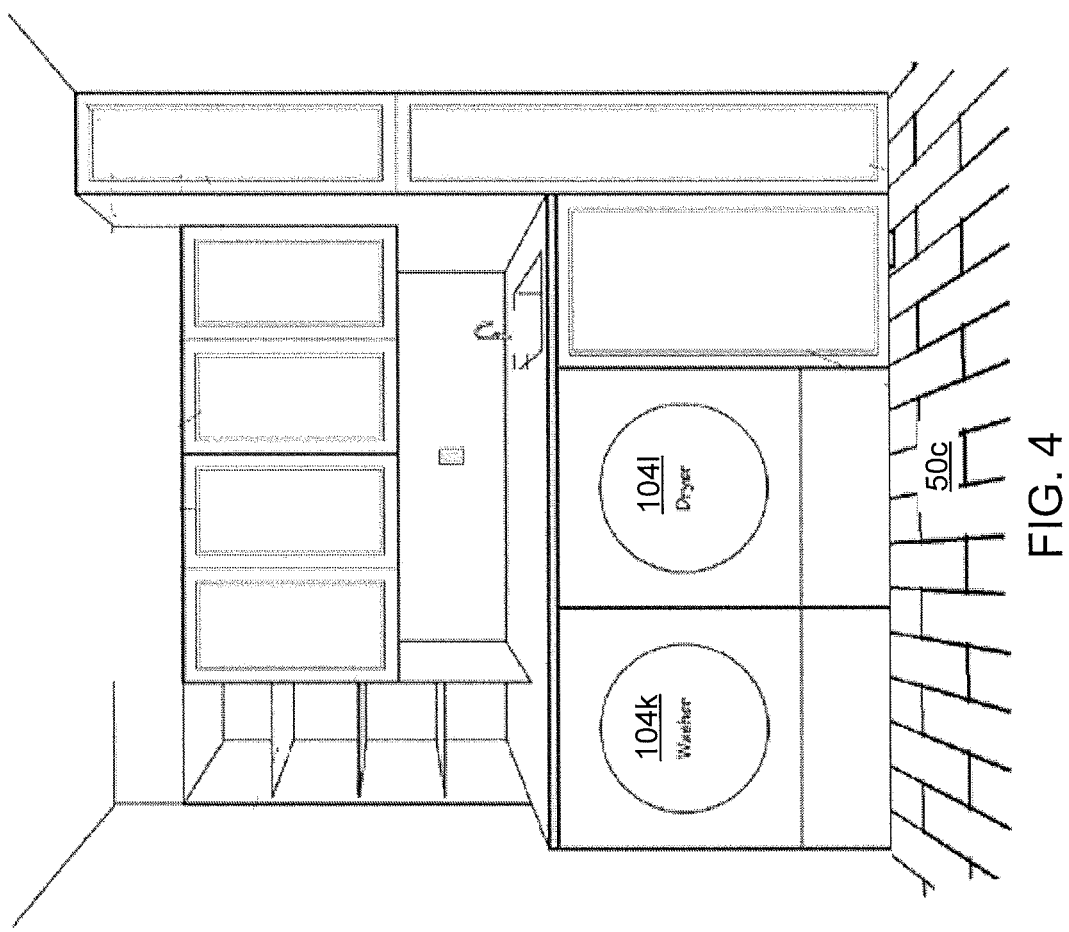
FIG. 4 illustrates a diagrammatic perspective view of one embodiment of a laundry room including a plurality of programmable devices therein, in accordance with the present disclosure.

FIGS. 2-4 illustrate a user 100 interacting with various rooms 50a-50c, such as a kitchen 50a, a living room 50b, and a laundry room 50c. Each of the rooms 50a-50c includes a plurality of programmable devices 104. In some embodiments, when a user 100 enters a room 50a-50c, the programmable devices 104 within the room 50a-50c are automatically configured with a preferred language of the user 100. In some embodiments, the programmable devices 104 in each room are programmed when the user 100 enters the individual room 50a-50c. In other embodiments, the rooms 50a-50c are programmed simultaneously when a user 100 enters a structure (such as a house or apartment) containing each of the rooms 50a-50c. The programmable device 104 can comprise any suitable programmable device, such as, for example, refrigeration/mini-bar 104a, dishwasher 104b, stove/oven 104c, microwave 104d, coffee maker, television 104e, thermostat 104f, smoke/carbon detection 104g, audio system 104h radio 104i, remote control 104j, washer 104k, or dryer 104l, and/or any other suitable programmable device.

Figure 5:
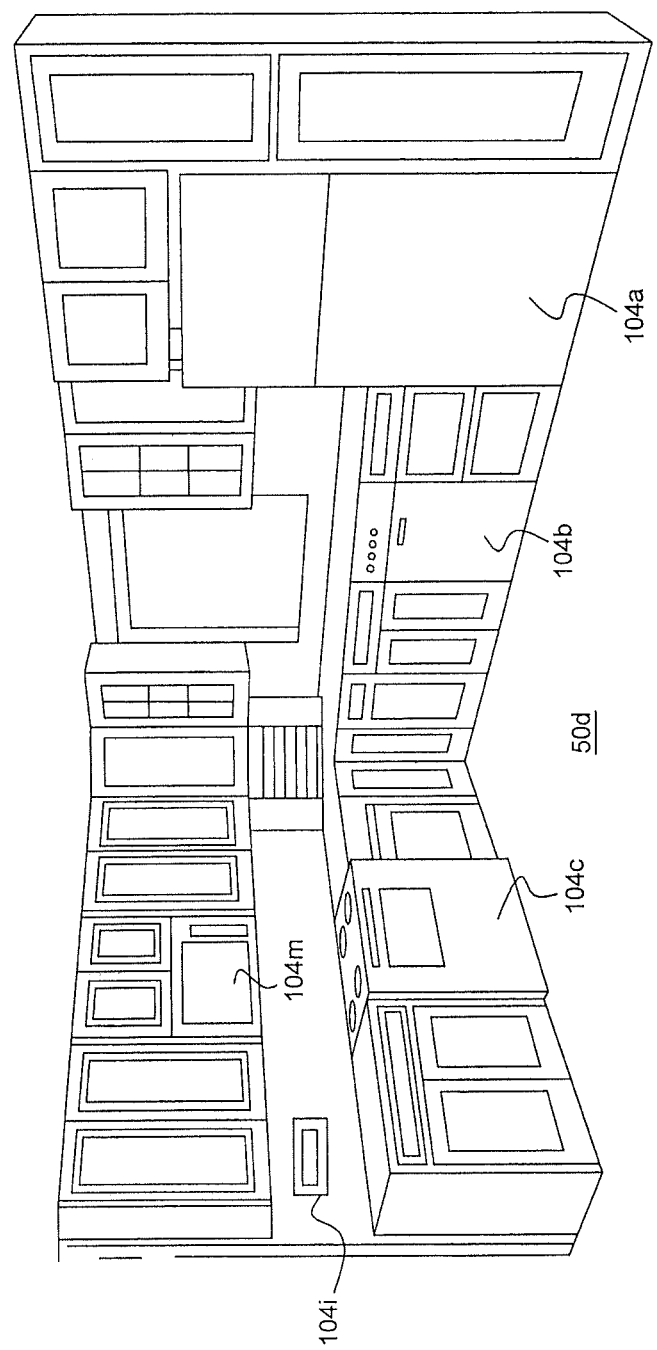
FIG. 5 is a diagrammatic perspective view of one embodiment of a room including a plurality of programmable devices programmed by a prior device interaction, in accordance with the present disclosure.

FIG. 5 is a diagrammatic perspective view of one embodiment of a room 50d including a plurality of programmable devices 104 programmed by a prior device interaction, in accordance with the present disclosure. In some embodiments, a programmable device 104m is introduced into a room containing one or more programmable devices 104 that have previously interacted with a user device 101. The one or more programmable devices 104 contain user language preference data due to the prior interaction. In some embodiments, the one or more programmable devices 104 provide the user language preference to the programmable device 104m added to the room 50d. Configuration of the new programmable device 104m can occur automatically when the device 104m is powered on and/or manually initiated, for example, through a button or other interface on the device 104_.

Figure 6:
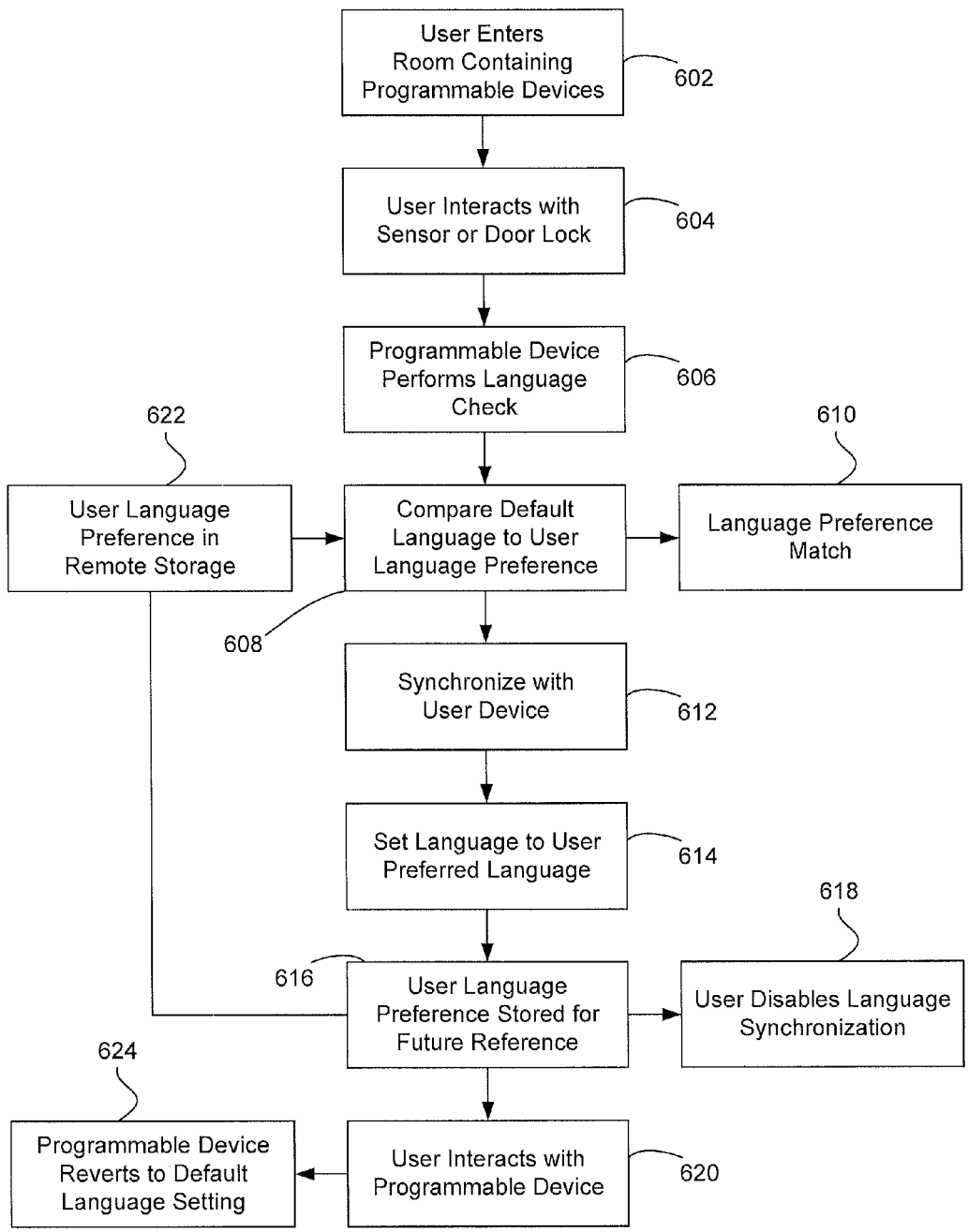
FIG. 6 is a flow diagram illustrating one embodiment of a method for setting the active language of one or more programmable devices, in accordance with the present disclosure.

FIG. 6 is a flow diagram illustrating one embodiment of a method 600 for setting the active language of one or more programmable devices, accordance with the present disclosure. In step 602, a user 100 enters a room 50 including a plurality of programmable devices 104. A sensor 105 and/or a door lock 103 can be configured to detect the presence of user 100 and/or a user device 101. In an optional step 604, a user 100 interacts with a door lock 103, for example, by placing a user device 101 in proximity and/or contact with the door lock 103. In step 606, one or more programmable devices 104 and/or a control hub 140 performs a language check to determine a user preferred language. The language check can be performed by connecting to a user device 101 over a network 150 and/or accessing a remote storage having a user language preference stored thereon. In some embodiments, in step 622, the user language preference is loaded from a storage unit, such as a remote storage.

In step 608, the one or more programmable devices 104 check the current language of the device 104. If the current language of the device 104 matches the default language preference of the user 100, the user experience is fulfilled 610 and the method exits. If the language preference of the device 104 does not match the user language preference, the programmable device 104 synchronizes with a user device 100 and/or a remote storage to obtain the user language preference in step 612 and sets the language of the device 104 to the user language preference in step 614. In some embodiments, the default device language preference of the user 100 can be stored for future reference in step 616. In some embodiments, a user 100 can disable the language synchronization and storage features in step 618.

In step 620, the user 100 can interact with the programmable device 104, and the user experience is considered fulfilled. In some embodiments, in step 624, the programmable device 104 reverts to a default language after the user 100 leaves the room 50 and/or after a predetermined time period. In some embodiments, the programmable device 104 maintains the user language preference until a new user 100 interacts with the room 50 and/or the device 104.

Figure 7:
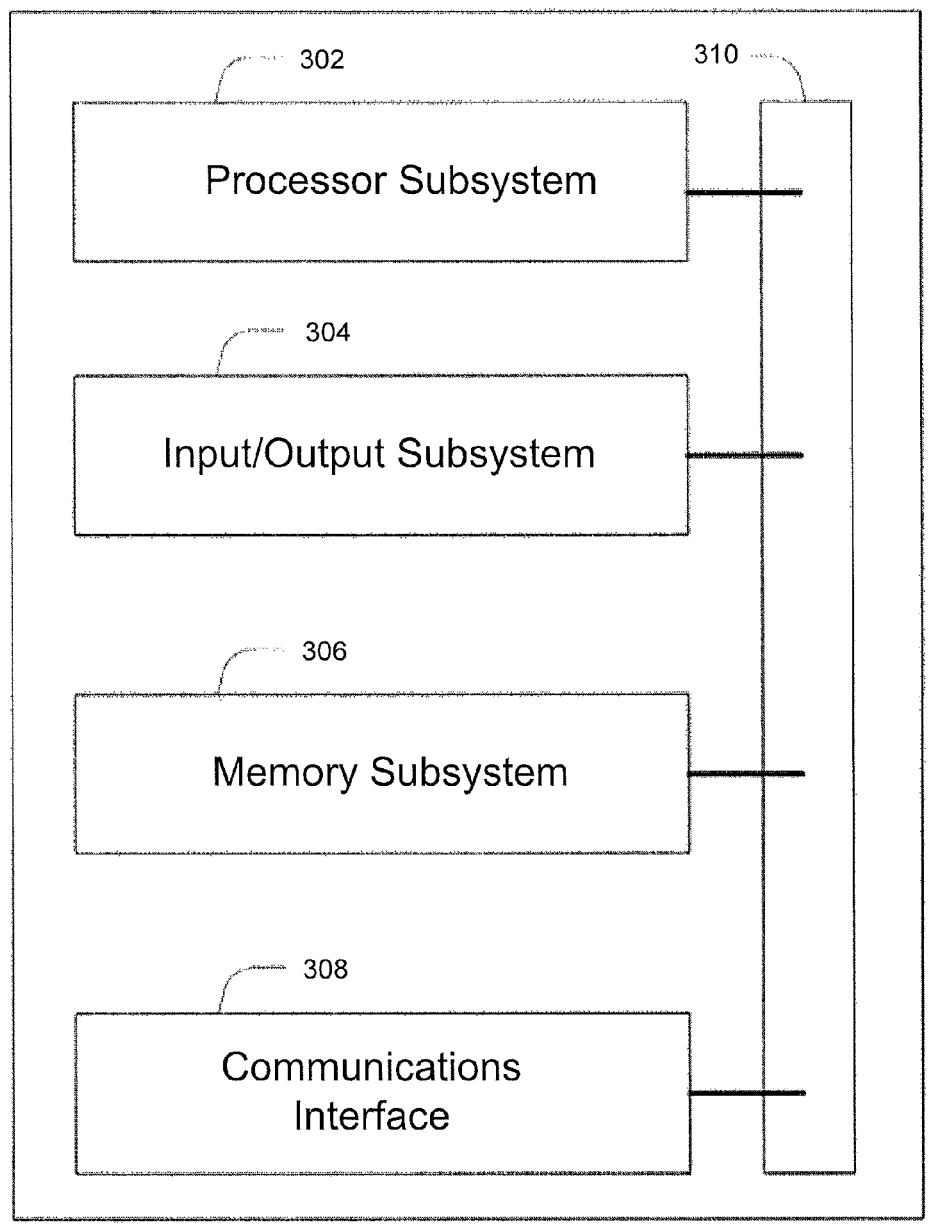
FIG. 7 is a schematic view illustrating a device for implementing the system and method of customization third-party devices using a smart device, in accordance with the present disclosure.

FIG. 7 is a schematic view of an illustrative electronic device 300 capable of implementing the system and method of customization third-party devices using a smart device. The electronic device 300 is a representative device that be a representative embodiment of the user device 101, the one or more third-party devices 104, and/or a portion of the user device and/or the third-party devices. The electronic device 300 may comprise a processor subsystem 302, an input/output subsystem 304, a memory subsystem 306, a communications interface 308, and a system bus 310. In some embodiments, one or more than one of the electronic device 300 components may be combined or omitted such as, for example, not including the communications interface 308. In some embodiments, the electronic device 300 may comprise other components not combined or comprised in those shown in FIG. 7. For example, the electronic device 300 also may comprise a power subsystem. In other embodiments, the electronic device 300 may comprise several instances of the components shown in FIG. 7. For example, the electronic device 300 may comprise multiple memory subsystems 306. For the sake of conciseness and clarity, and not limitation, one of each of the components is shown in FIG. 7.

The processor subsystem 302 may comprise any processing circuitry operative to control the operations and performance of the electronic device 300. In various aspects, the processor subsystem 302 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 302 also may be implemented by a controller, a microcontroller, an application specific integrated circuit (ASIC), a field programmable gate array (FPGA), a programmable logic device (PLD), and so forth.

In various aspects, the processor subsystem 302 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, the electronic device 300 may comprise a system bus 310 that couples various system components including the processing subsystem 302, the input/output subsystem 304, and the memory subsystem 306. The system bus 310 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

Figure 8:
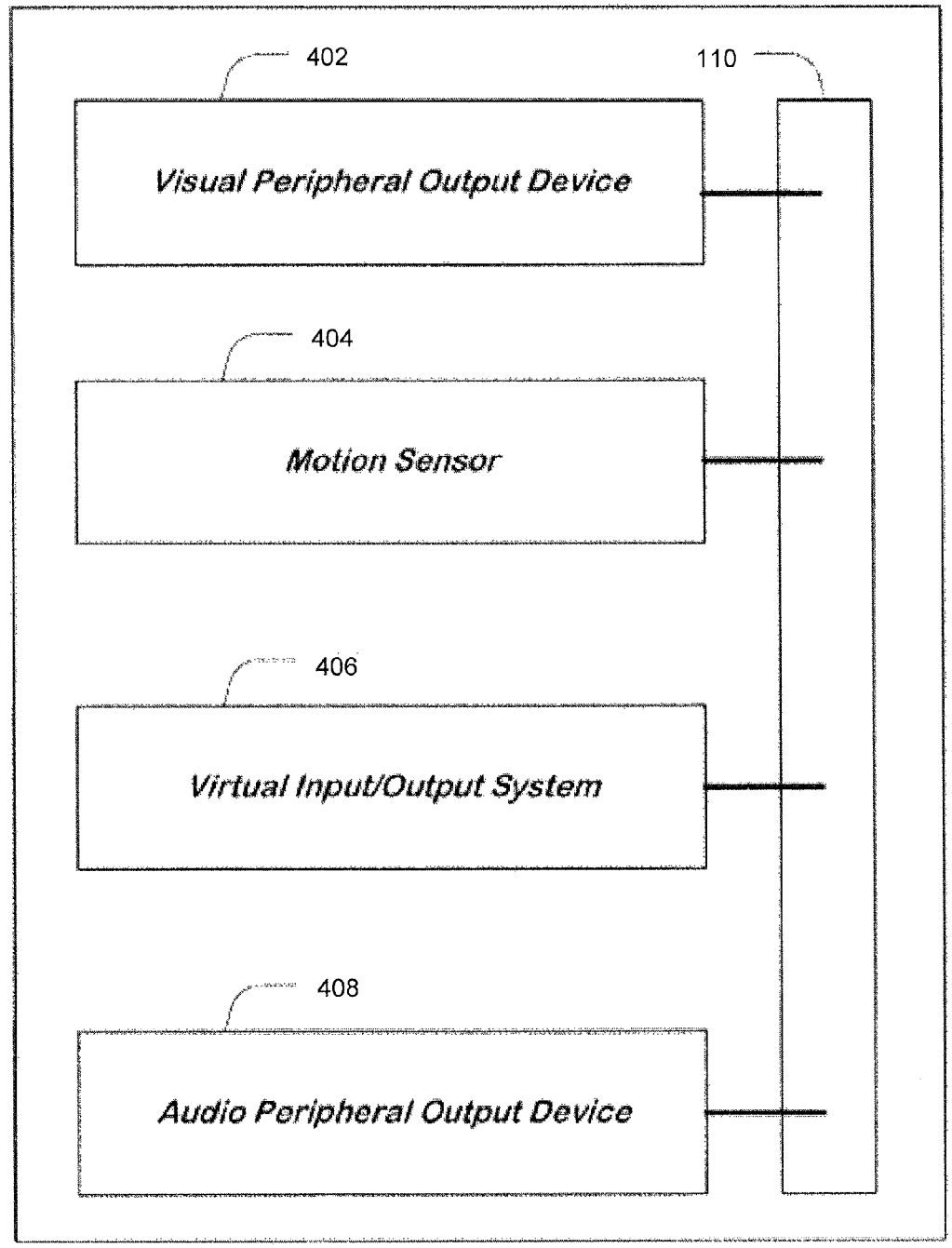
FIG. 8 is a schematic view illustrating an embodiment of the input/output subsystem, in accordance with the present disclosure.

FIG. 8 shows one embodiment of the input/output subsystem 304 of the electronic device 300 shown in FIG. 7. The input/output subsystem 304 may comprise any suitable mechanism or component to at least enable a user to provide input to the electronic device 300 and the electronic device 300 to provide output to the user. For example, the input/output subsystem 304 may comprise any suitable input mechanism, including but not limited to, a button, keypad, keyboard, click wheel, touch screen, or motion sensor. In some embodiments, the input/output subsystem 304 may comprise a capacitive sensing mechanism, or a multi-touch capacitive sensing mechanism.

In some embodiments, the input/output subsystem 304 may comprise specialized output circuitry associated with output devices such as, for example, an audio peripheral output device 408. The audio peripheral output device 408 may comprise an audio output including on or more speakers integrated into the electronic device. The speakers may be, for example, mono or stereo speakers. The audio peripheral output device 408 also may comprise an audio component remotely coupled to audio peripheral output device 408 such as, for example, a headset, headphones, and/or ear buds which may be coupled to the audio peripheral output device 408 through the communications subsystem 308.

In some embodiments, the input/output subsystem 304 may comprise a visual peripheral output device 402 for providing a display visible to the user. For example, the visual peripheral output device 402 may comprise a screen such as, for example, a Liquid Crystal Display (LCD) screen, incorporated into the electronic device 300. As another example, the visual peripheral output device 402 may comprise a movable display or projecting system for providing a display of content on a surface remote from the electronic device 300. In some embodiments, the visual peripheral output device 402 can comprise a coder/decoder, also known as a Codec, to convert digital media data into analog signals. For example, the visual peripheral output device 402 may comprise video Codecs, audio Codecs, or any other suitable type of Codec.

The visual peripheral output device 402 also may comprise display drivers, circuitry for driving display drivers, or both. The visual peripheral output device 402 may be operative to display content under the direction of the processor subsystem 302. For example, the visual peripheral output device 402 may be able to play media playback information, application screens for application implemented on the electronic device 300, information regarding ongoing communications operations, information regarding incoming communications requests, or device operation screens, to name only a few.

In some embodiments, the input/output subsystem 304 may comprise a motion sensor 404. The motion sensor 404 may comprise any suitable motion sensor operative to detect movements of electronic device 300. For example, the motion sensor 404 may be operative to detect acceleration or deceleration of the electronic device 300 as manipulated by a user. In some embodiments, the motion sensor 404 may comprise one or more three-axis acceleration motion sensors (e.g., an accelerometer) operative to detect linear acceleration in three directions (i.e., the x or left/right direction, the y or up/down direction, and the z or forward/backward direction). As another example, the motion sensor 404 may comprise one or more two-axis acceleration motion sensors which may be operative to detect linear acceleration only along each of x or left/right and y or up/down directions (or any other pair of directions). In some embodiments, the motion sensor 404 may comprise an electrostatic capacitance (capacitance-coupling) accelerometer that is based on silicon micro-machined MEMS (Micro Electro Mechanical Systems) technology, a piezoelectric type accelerometer, a piezoresistance type accelerometer, or any other suitable accelerometer.

In some embodiments, the motion sensor 404 may be operative to directly detect rotation, rotational movement, angular displacement, tilt, position, orientation, motion along a non-linear (e.g., arcuate) path, or any other non-linear motions. For example, when the motion sensor 404 is a linear motion sensor, additional processing may be used to indirectly detect some or all of the non-linear motions. For example, by comparing the linear output of the motion sensor 404 with a gravity vector (i.e., a static acceleration), the motion sensor 404 may be operative to calculate the tilt of the electronic device 300 with respect to the y-axis. In some embodiments, the motion sensor 404 may instead or in addition comprise one or more gyro-motion sensors or gyroscopes for detecting rotational movement. For example, the motion sensor 404 may comprise a rotating or vibrating element.

In some embodiments, the motion sensor 404 may comprise one or more controllers (not shown) coupled to the accelerometers or gyroscopes. The controllers may be used to calculate a moving vector of the electronic device 100. The moving vector may be determined according to one or more predetermined formulas based on the movement data (e.g., x, y, and z axis moving information) provided by the accelerometers or gyroscopes.

In some embodiments, the input/output subsystem 304 may comprise a virtual input/output system 406. The virtual input/output system 406 is capable of providing input/output options by combining one or more input/output components to create a virtual input type. For example, the virtual input/output system 406 may enable a user to input information through an on-screen keyboard which utilizes the touch screen and mimics the operation of a physical keyboard or using the motion sensor 404 to control a pointer on the screen instead of utilizing the touch screen. As another example, the virtual input/output system 406 may enable alternative methods of input and output to enable use of the device by persons having various disabilities. For example, the virtual input/output system 406 may convert on-screen text to spoken words to enable reading-impaired persons to operate the device.

Figure 9:
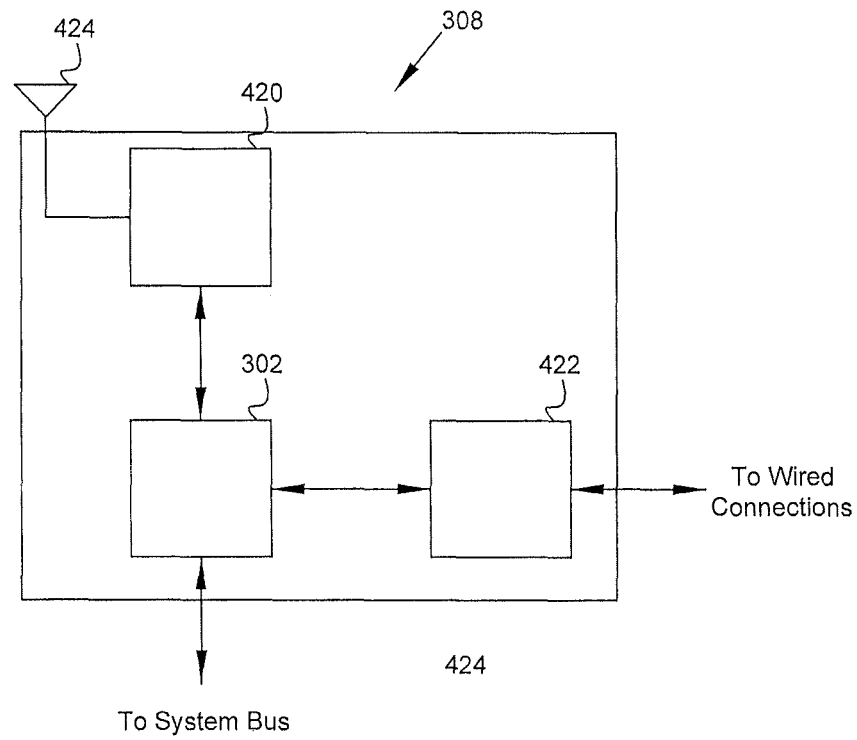
FIG. 9 shows one embodiment of the communication interface, in accordance with the present disclosure.

FIG. 9 shows one embodiment of the communication interface 308. The communications interface 308 may comprises any suitable hardware, software, or combination of hardware and software that is capable of coupling the electronic device 300 to one or more networks and/or additional devices (such as, for example, a user device 103 or one or more third-party devices 4a-4c.) The communications interface 308 may be arranged to operate with any suitable technique for controlling information signals using a desired set of communications protocols, services or operating procedures. The communications interface 308 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, smart devices such as those discussed herein, and/or any other suitable smart device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 308 may comprise one or more interfaces such as, for example, a wireless communications interface 420, a wired communications interface 422, a network interface, a transmit interface, a receive interface, a media interface, a system interface, a component interface, a switching interface, a chip interface, a controller, and so forth. When implemented by a wireless device or within wireless system, for example, the communications interface 308 may comprise a wireless interface 420 comprising one or more antennas 424, transmitters, receivers, transceivers, amplifiers, filters, control logic, and so forth.

In various aspects, the communications interface 308 may provide voice and/or data communications functionality in accordance with different types of cellular radiotelephone systems. In various implementations, the described aspects may communicate over wireless shared media in accordance with a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described aspects may comprise part of a cellular communication system. Examples of cellular communication systems may comprise CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G) wireless standards, and so forth.

Figure 10:
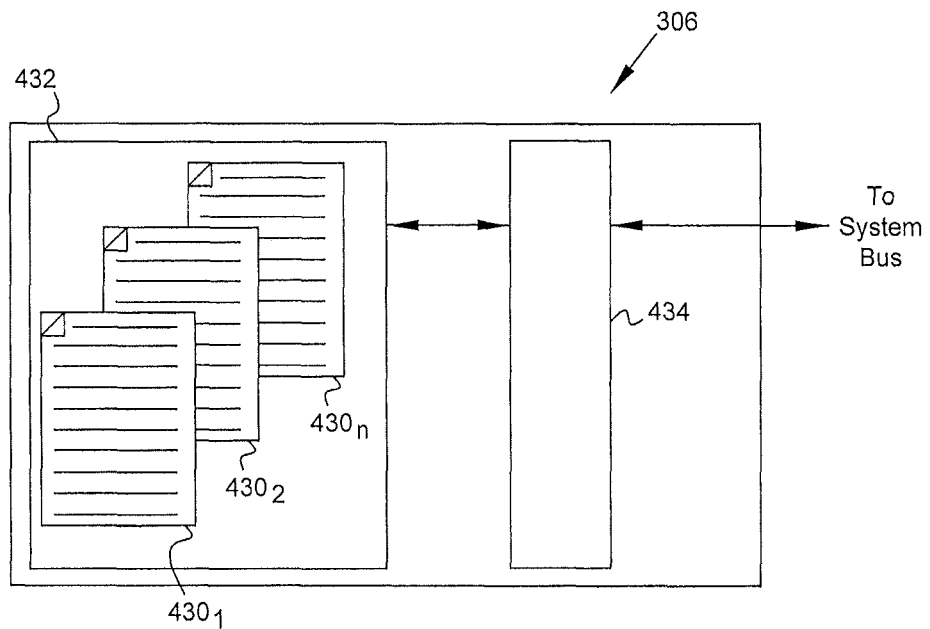
FIG. 10 illustrates an embodiment of the memory subsystem, in accordance with the present disclosure

FIG. 10 shows one embodiment of the memory subsystem 306. The memory subsystem 306 may comprise any machine-readable or computer-readable media capable of storing data, including both volatile/non-volatile memory and removable/non-removable memory. The memory subsystem 306 may comprise at least one non-volatile memory unit 430. The non-volatile memory unit 430 is capable of storing one or more software programs $432_1$-$432_n$. The software programs $432_1$-$432_n$ may contain, for example, applications, user data, device data, and/or configuration data, or combinations therefore, to name only a few. The software programs $432_1$-$432_n$ may contain instructions executable by the various components of the electronic device 300.

In various aspects, the memory subsystem 306 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the memory subsystem 306 may contain a software program for transmitting and/or receiving customization information and/or data mining elements. In one embodiment, the memory subsystem 306 may contain an instruction set, in the form of a file $432n$ for executing a method of customization on the electronic smart device 100. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 302.

It is understood that that the above described arrangements are only illustrative of the application of the principles of the present disclosure. Numerous modification and alternative arrangements may be devised by those skilled in the art without departing from the spirit and scope of the present invention. Thus, while the present invention has been shown in the drawing and fully described above with particularity and detail in connection with what is presently deem to be the practical and preferred embodiments of the disclosure, it will be apparent to those of ordinary skill in the art that numerous modifications, including, but not limited to, variations in size, materials, shape, form, function, manner of operation, assembly, and use may be made without departing from the principles and concepts of the disclosure.

It is understood that when an element is referred hereinabove as being "placed on" another element, it can be directly on the other element or intervening elements may be present there between.

It is understood that when an internet of things/smart devices/appliances devices or smart phone is referred hereinabove as being "turned on" that electrical power may be which may require device to be plugged into electrical system or that the device needs to the "power on switch" activated.

It is understood that when an element is referred hereinabove as a "personal electronic device" that it could be referencing a smart phone, smart tablet, smart watch, smart card or any other smart devices.

Spatially relative terms, such as "beneath," "below," "lower," "above," "upper," "next to" and the like, are used herein for ease of description to describe one element or feature's relationship to another element(s) or feature(s) as illustrated in the figures. It is understood that the spatially relative terms are intended to encompass different orientations of the devices in use or operations in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with references to cross section illustrations that are schematic illustrations of idealized embodiments. As such, variations from the shapes of the illustrations as a result, for example of manufacturing techniques and/or tolerances, are to be expected. Thus examples embodiments described herein should not be construed as limited to the particular shapes of regions as illustrated herein, but are to include deviations in shape or size that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes and/or sizes are not intended to illustrate the precise shape and/or size of a region and are not intended to limit the scope of the present claims.

What is claimed is:

1. An automatic programmable device language setting method for customizing one or more programmable devices with an active language setting and wherein said programmable device is located within a habitation or temporary habitation space, and said space located within an indoor space environment and/or outdoor space environment, for use by a user having a preferred native language and a user device, comprising:

monitoring, by a networked monitoring device which is configured to control configuration of at least one programmable device;

detecting, by another programmable device within said space, at least one user device and at least one programmable device presence in said space;

receiving, at least a user language preference from a plurality of language reference devices comprising of at least a user device, the another programmable device, and remote storage device and wherein the user language preference is received from at least one of the language reference device;

setting, by the another programmable device, at least an active preferred language on at least one programmable device to the preferred language of a user; and displaying and/or outputting, a customized information on at least one programmable device and/or the another programmable device within said space to the preferred language of said user.

2. The automatic programmable device language setting method as recited in claim 1, wherein said user is associated with at least one personal user device, and wherein the user language preference is automatically received from a at least one user personal device.

3. The automatic programmable device language setting method as recited in claim 2, comprising establishing connectivity between the user device and programmable device, for at least language determination.

4. The automatic programmable device language setting method as recited in claim 3, wherein connectivity is established by proximity between the user device and a communication sensor.

5. The automatic programmable device language setting method as recited in claim 1, wherein the user language preference is received from a configured programmable device, wherein the configured programmable device is previously configured with the user language preferences.

6. The automatic programmable device language setting method as recited in claim 1, wherein the step of determining the preferred language of the user further comprises scanning messages and/or emails for language usage and/or scanning other incoming and/or outgoing communication of said user device for language determination; and said language determination is to be used for establishing at least a language preference for at least one programmable device.

7. The automatic programmable device language setting method as recited in claim 1, wherein the user language preference is received for at least one programmable device from a remote storage.

8. The automatic programmable device language setting method as recited in claim 1, wherein the one or more programmable device are customized by a control hub.

9. The automatic programmable device language setting method as recited in claim 1, comprising reverting, the one or more programmable devices to a default language when said user leaves the space and/or when said user no longer requires the use of said programmable device.

10. The automatic programmable device language setting method as recited in claim 1, comprising storing, the user language preference in a remote storage.

11. A system for automatically setting an active language on a programmable device located within a predetermined space for use by at least one user having a preferred native language and said user being in possession of at least one user device, comprising:

at least one programmable device and another programmable device including a programmable language element, wherein the programmable device and the another programmable device is located within a predetermined space, and wherein a networked monitoring device which is configured to control configuration of at least one programmable device and the another programmable device which is associated with a predetermined space, and wherein the at least one programmable device is configured to receive at least a user language preference from a plurality of language reference devices comprising of at least a user device, the another programmable device, and remote storage device and wherein the user language preference is received from at least one of the language reference device, and wherein the programmable language element of the programmable device is automatically customized over the network with the user language preference by the another programmable device, and the at least one programmable device displays and/or outputs customized information in a user preferred language.

12. The system of claim 11, wherein the user language preference is received from a user personal device.

13. The system of claim 12, wherein the at least programmable device is configured to establish connectivity with the user device.

14. The system of claim 13, wherein connectivity is established by proximity between the user device and the at least one programmable device.

15. The system of claim 11, wherein the user language preference is received from a configured programmable device, wherein the configured programmable device is previously configured with the user language preference.

16. The system of claim 11, where the at least one programmable device is configured to determine the preferred language of the user from scanning messages and/or emails located on said user device for language usage example and/or scanning other incoming and/or outgoing communication of said user device for language determination; and said language determination is to be used for establishing a language preference for at least one programmable device.

17. The system of claim 11, wherein the user language preference is received from a remote storage.

18. The system of claim 11, comprising a control hub in signal communication with the at least one programmable device, wherein the control hub is configured to provide the user language preference to the at least one programmable device.

19. The system of claim 11, wherein the at least one programmable device is configured to revert to a default language where the user device is outside of a predetermined area and/or outside of communication sensor range and/or user no longer needs the use of the programmable device.

20. A method for customizing a programmable device, comprising:
   monitoring, by a networked monitoring device which is configured to control configuration of at least one programmable device and another programmable device associated within predetermined proximity;
   detecting, by the another programmable device, a user device within a predetermined proximity;
   establishing, by the another programmable device, a connection with a user device;
   receiving, at least a user language preference from a plurality of language reference devices, wherein said language reference devices comprises of at least a user device, the another programmable device, and remote storage device and wherein the user language preference is received from at least one of the language reference device;
   customizing of the programmable device, at least a language element with the user language preference by the another programmable device; and
   display and/or outputting, the customized information on at least one programmable device and the another programmable device within said space to the preferred language of said user.

* * * * *